UNITED STATES PATENT OFFICE.

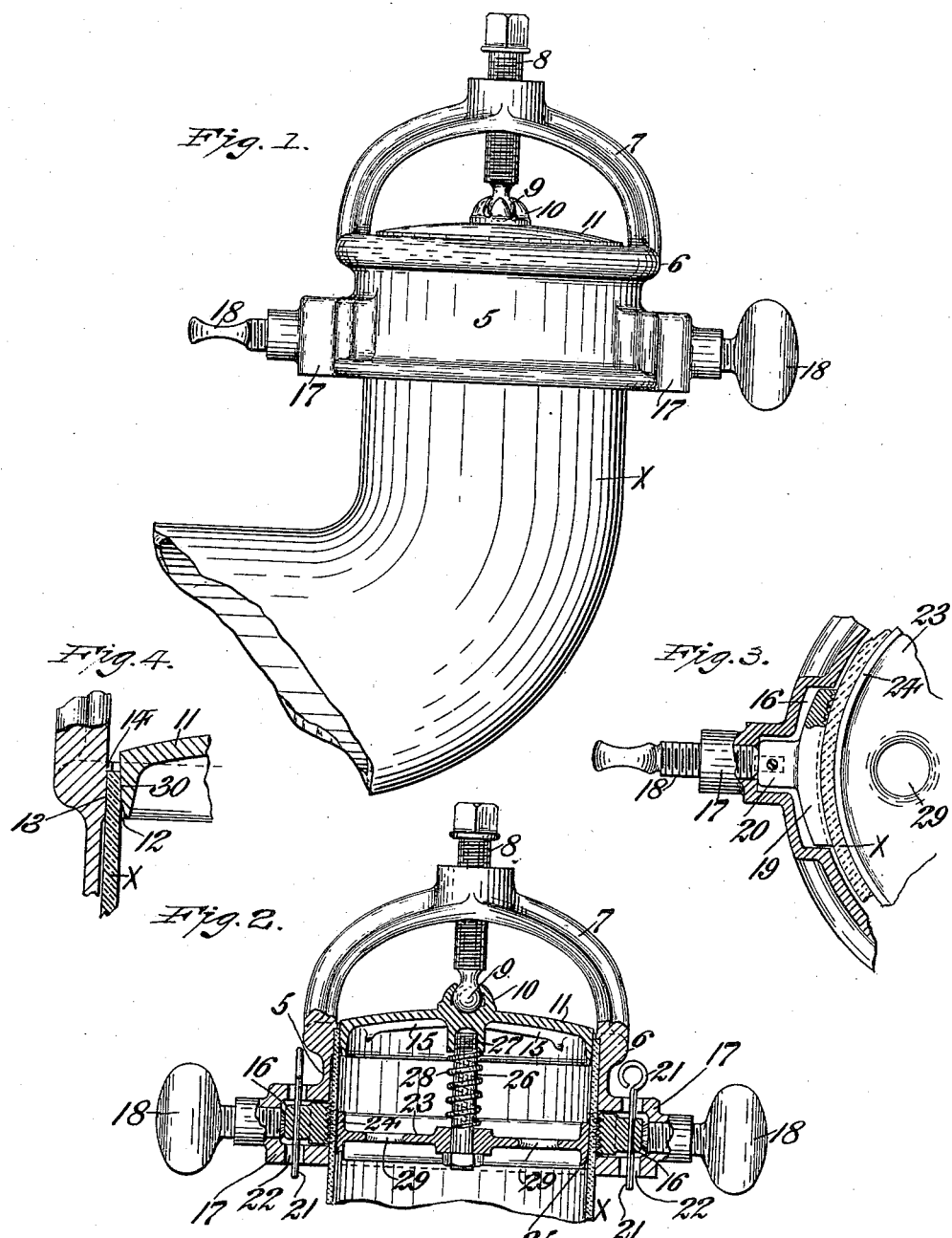

WILLIAM A. FLEMING, OF NEW YORK, N. Y.

DEVICE FOR CLOSING PIPE ENDS.

1,013,932.     Specification of Letters Patent.     Patented Jan. 9, 1912.

Application filed March 6, 1911. Serial No. 612,494.

*To all whom it may concern:*

Be it known that I, WILLIAM A. FLEMING, a citizen of the United States, and a resident of the borough of Manhattan, in the city, county, and State of New York, have invented certain new and useful Improvements in Devices for Closing Pipe Ends, of which the following is a specification.

In the plumbing of dwellings or other buildings it is the custom, after the soil pipe has been erected, and the pipes connecting the closets and other plumbing apparatus therewith have been secured in place, to test these pipes by water under pressure, with a view to determining as to whether or not there is or are any leak or leaks in them through which the water and sewer gas may escape and enter the building, and this is, in fact, required by the ordinances of the cities of the country generally.

In the plumbing of the building, the pipes intermediate the several closets and other plumbers' fixtures on the one hand, and the soil pipe on the other, are usually made of lead, and, in making the test referred to, it has been necessary before the test was made to close the free ends of the various connecting pipes, by soldering a plate over each, which, after the test has been completed, had to be removed before flanging of the free ends of the pipe for reception of their respective closets or other fixtures could be accomplished. This method of closing the free ends of the connecting pipes, while satisfactory to a certain degree, involves some considerable time and expense, and, besides, it not infrequently happens that, when the stand or soil pipe is of considerable height, the plates or caps of some of the lower connecting pipes are forced off, in whole or in part, necessitating their replacement or the closure of such leak or leaks as may appear between them and the pipes to which they are soldered. One way of overcoming these defects is described and claimed in Patent No. 918,137, granted to me April 13, 1909; wherein the closure of the free ends of these connecting pipes is effected by spinning over the material of the pipes at these ends. My present invention however seeks to obviate these and other methods of closure heretofore employed, and to provide a tool or appliance which can be applied to the free end of the connecting pipe to effectually close it, and then bodily removed after the pressure tests described, and be in condition for use again on another pipe of the same diameter, and so on indefinitely.

To these ends, the present invention consists in a tool or appliance having a plug member to tightly close a pipe end, and other members which will prevent the internal pressure during the tests from either dislodging the plug or enlarging the pipe end around the plug and so permitting the testing fluid to escape around the plug.

In the accompanying drawings: Figure 1— is a side elevation of my improved device as applied to a piece of pipe which, in this case, is a lead L. Fig. 2— is a similar view, but partly in section. Fig. 3— represents a partial horizontal section on a line above the inner or disk member of the clamp. Fig. 4— is a detail view similar to a portion of Fig. 2, but on a larger scale.

Similar reference characters indicate the same or similar parts in all of the views.

The device, which practically constitutes a tool or implement, consists of an annulus 5 the upper edge of which is preferably thickened, as at 6, to successfully oppose the outward pressure exerted by the action of the plug as hereinafter described. Connected to or integral with said upper edge is a bridge piece or bracket 7 the center of which has an opening, internally threaded, for a screw 8 having a spherical lower end or ball 9, the latter engaging a socket 10 carried at the center of the plug 11. The plug 11 is tapered, as indicated in Figs. 2 and 4, to present a periphery which is of less diameter at its lower edge 12 than at its upper edge, so that when said plug is crowded into the end of a pipe $x$, by means of the screw 8, said plug will tend somewhat to expand the pipe. Material expansion is prevented however by the surrounding wall 13 of the annulus. This portion of the annulus, for convenience of description, will be referred to as the seat, and it will be understood, of course, that the device is made of the proper diameter to properly fit a pipe end of a given size. To facilitate ease of properly locating it on a pipe end, the device is preferably formed with an internal shoulder or rib 14 to engage the edge of the pipe end. To enable the plug to be made hollow, for the sake of lightness, and at the same time possess sufficient strength to withstand the crowding action of the screw 8, it is preferably made crowning or rounding as illustrated, and it may be formed with strengthening ribs 15.

It will now be understood that, with means for so holding the annulus that its seat 13 will remain snugly embracing the pipe end, when the screw 8 is turned in the right direction, the plug will be crowded into the pipe end, and when the latter is of ductile metal such as lead, said plug will form a tight closure that will enable the pipe to be subjected to the pressure tests described. And when those tests are concluded, turning the screw in the opposite direction will forcibly withdraw the plug and enable the device to be removed, the bridge piece 7 making a convenient handle for this and other manipulations. It will further be understood that if it should be desired to utilize the device in connection with tubular structures not made of ductile metal, it would only be necessary to properly apply suitable packing material.

In the drawings I have shown convenient and advantageous means for holding the annulus and its seat in position, although I do not limit myself to such particular means. In the structure shown, the annulus is formed with two diametrically opposite recesses 16, and with projections 17 having threaded openings for screws 18. Each recess contains a member 19 which, for purposes of definition but not of limitation, is herein termed an outer jaw. The inner face of each jaw is curved horizontally to fit the pipe x and said inner face is preferably roughened more or less. The jaws have lugs 20 against which the inner ends of the screws 18 bear. To keep the jaws in their recesses when the device is not on a pipe, the lugs 20 may have pins 21 (see Fig. 2) which pins pass through slots 22 in the walls of the recesses 16, the slots permitting the jaws to have the requisite in and out movements.

To enable the device to be used in connection with pipes the walls of which are so thin that they might not withstand the inward pressure of the jaws 19 when the screws 18 are turned in tightly enough to hold the device while it is being applied and during the pressure tests, I provide inner means opposite the jaws 19 to coact with the latter to clamp or grip the pipe walls. If said inner means consisted merely of two convex members of an area equal to the jaws 19, some difficulty would be encountered in properly locating them in the pipe. Such difficulty is overcome by providing a disk or web 23 having a circular wall 24 of a diameter to snugly fit the interior of the pipe, said wall being preferably somewhat tapering at its lower edge, as indicated at 25 in Fig. 2 to facilitate its entrance into the pipe end. Above the tapering portion, the wall is preferably cylindrical so that when located as shown in Fig. 2, there will be no liability of portions of the pipe being unduly pressed out of shape by the outer jaws. The said wall 24 constitutes, in effect, an inner jaw, since the pipe is clamped between it and the outer jaws 19. Proper location of the inner jaw is effected by connecting it with the plug and, through the latter and the screw 8 and bridge piece 7, with the annulus. The connection with the plug consists of a bolt 26 passing through a central hole in the web 23, and tapped into a threaded hole in a lug 27 projecting downwardly from the center of the plug. A spring 28 is shown as surrounding the bolt and confined between the web 23 and the lug 27. This spring serves to push the web to position when the device is being applied for use.

In Fig. 2, the parts are shown about as they would be before the plug is forced inwardly. When the screw 8 is operated, the plug is forced downwardly, and the bolt 26 slides through its bearing in the web 23 to whatever extent may be necessary, the spring 28 yielding. The web 23 is formed with one or more openings 29 to enable the testing fluid to pass to the closing plug 11.

When the device is applied, the screws 18 are first loosened so as to permit the jaws 19 to be retracted into the recesses 16. Then the annulus is slipped onto the pipe end, the inner jaw 24 passing down inside, until the shoulder 14 rests on the top of the pipe. At this time, the plug occupies, or nearly occupies, the position shown in Fig. 2. Then the screws 18 are operated to cause the jaws 19 to grip the pipe, and then the screw 8 is manipulated to force the plug so firmly into the pipe end as to effectually close it for the purposes described.

As indicated in Fig. 4, the periphery of the plug is slightly tapered at 30 to effect the tight closure described, the more decided tapering at 12 being chiefly to facilitate the proper entrance of the plug into the pipe end. During the tests, the inner and outer jaws positively hold the plug in effective position, and the annular seat 13 prevents the internal pressure from enlarging the pipe end so as to permit any fluid to escape around the plug. After the tests are completed, reverse operations of the screws 8 and 18 release the device so that it, including all its members, can be removed, the bridge piece 7 serving as a handle.

Having described my invention what I claim is:

1. A device of the character described, comprising an annulus provided with a seat for a pipe end, a plug of less diameter than said seat and normally in the plane thereof, clamping jaws carried by said annulus, and opposing clamping means to coact with said jaws to grip the pipe in a different plane from that of the plug and seat.

2. A device of the character described, comprising an annulus provided with a seat for a pipe end, a plug of less diameter than said seat and normally in the plane thereof, said annulus having recesses, jaws mounted in said recesses, means for adjusting said jaws, and a circular jaw connected to said plug and adapted to fit within the pipe in substantially the plane of the first-mentioned jaws.

3. A device of the character described, comprising inner and outer jaw members adapted to clamp a pipe, an annulus provided with a seat for a pipe end, and a plug connected to said jaw members and adjustable toward and from the plane of the annulus to clamp and unclamp the pipe between it and the annulus.

4. A device of the character described, comprising an annulus having outer jaw members, a plug and means to adjust it axially of said annulus, and an inner jaw member to oppose the pressure of the outer jaws.

5. A device of the character described, comprising an annulus having outer jaw members, a plug, and means to adjust it axially of said annulus, and an inner jaw member to oppose the pressure of the outer jaws, said inner jaw member being yieldingly connected to said plug.

In testimony whereof, I affix my signature in presence of two witnesses.

WILLIAM A. FLEMING.

Witnesses:
F. N. Du Bois,
F. W. Blanwell.

---

Copies of this patent may be obtained for five cents each, by addressing the "Commissioner of Patents, Washington, D. C."